Jan. 8, 1924.
F. L. MORSE
MULTIPLATE POWER CHAIN
Filed May 16, 1921
1,480,527
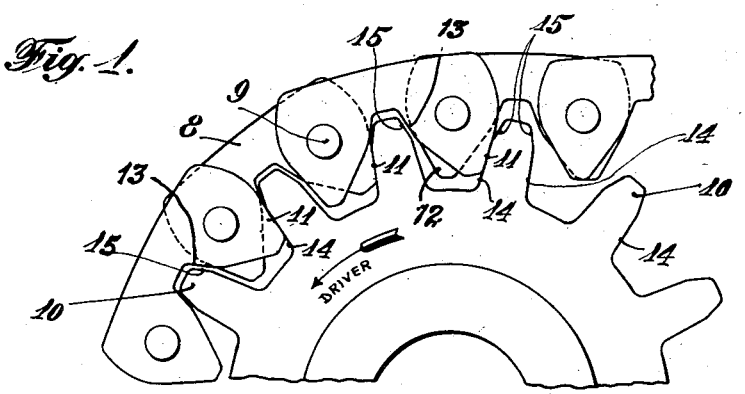
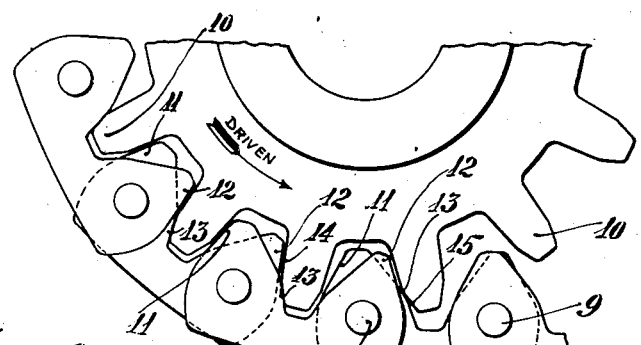
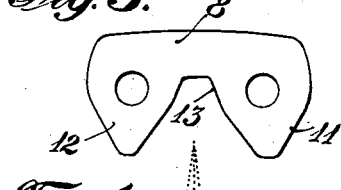
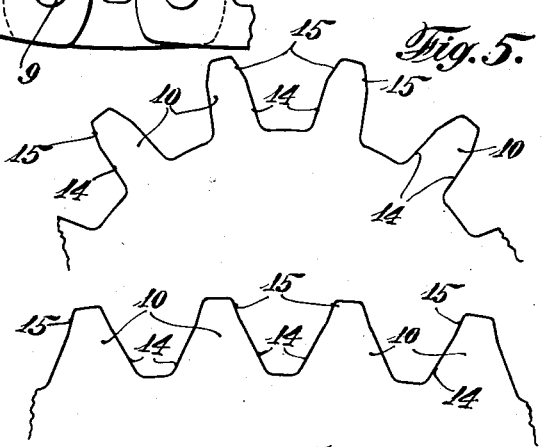
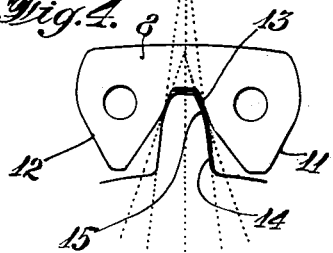
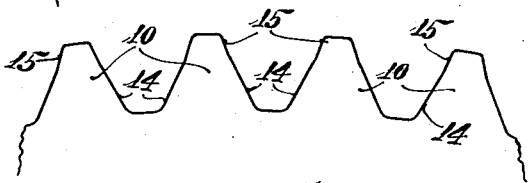
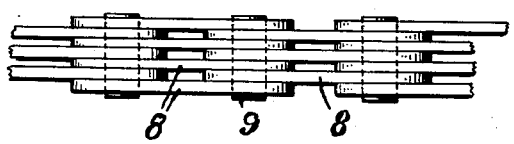
INVENTOR
Frank L. Morse
BY
Edward A. Wright
ATTORNEY

Patented Jan. 8, 1924.

1,480,527

UNITED STATES PATENT OFFICE.

FRANK L. MORSE, OF ITHACA, NEW YORK, ASSIGNOR TO THE MORSE CHAIN COMPANY, OF ITHACA, NEW YORK, A CORPORATION OF NEW YORK.

MULTIPLATE POWER CHAIN.

Application filed May 16, 1921. Serial No. 469,789.

*To all whom it may concern:*

Be it known that I, FRANK L. MORSE, a citizen of the United States, residing at Ithaca, in the county of Tompkins and State of New York, have invented a certain new and useful Improvement in Multiplate Power Chains, of which improvement the following is a specification.

This invention relates to drive chains for power transmission, and more particularly to the multiplate type of chain in which the links are each composed of a plurality of arch-shaped plates, and joined by either single or multi-part pintles.

According to a prior standard construction of this type, the links are formed to engage the sprockets at only one end of the links, the engagement being external, or on one of the outside ends of the link plates for the driving sprocket, and internal, or at the inside of the plates, for the driven sprocket. It is also the practice to construct the sprocket wheels with teeth having a single plane bearing surface upon each side of each tooth, the angle of said surface relative to a radial line through the centre of the tooth, varying according to the diameter of wheel and number of teeth. With this construction, one end of the links runs practically free from the sprockets and the chain is designed to run more particularly in one forward direction.

It has also been proposed to form the link plates with external sprocket engaging surfaces at both ends, and an internal sprocket engaging surface at one end, the latter surface being arranged so as to wear down to a plane coinciding with that of the external engaging surface of the adjoining link, whereby both then engage the single plane surface of the sprocket and prevent any tendency of the chain to slip over the top of the sprockets, as set forth in my prior Patent No. 989,719, of April 18, 1911.

According to my present improvement, the teeth of the sprocket wheel are formed at their outer ends with a bearing face adapted to fit the inside engagement of the links while the inner portion of each tooth is formed to fit the external or outside end engagement of the links. With this construction the angle between the outer bearing faces and the radius at the centre of the tooth is constant for all sizes of wheels and is equal to the fixed angle formed at the inside engagement upon the link itself, but the angle of the inner bearing face portion of the teeth varies according to the size of wheel and number of teeth, in the same manner as before. The advantage of this construction is that the compensating feature of the chain is controlled by a constant angle to the line of pull, and this is particularly beneficial in a drive having sprockets with a small number of teeth, such as twelve to eighteen, so commonly used in automobile work for the accessory, or driven sprocket, as with the contact on the greater angle to the line of pull, the chain is much more silent and efficient in operation.

In the accompanying drawing: Figure 1 is a side elevation of a chain and a portion of a driving sprocket embodying my improvement; Fig. 2, a similar view illustrating the position of the chain upon the driven sprocket; Fig. 3, a side view of a single link; Fig. 4, a diagram illustrating a link applied to a single tooth of a sprocket wheel and indicating, in dotted lines, the various angles of the engaging faces; Fig. 5, a diagram indicating the tooth form for a small wheel; Fig. 6, a similar diagram indicating the tooth form for a larger wheel; and, Fig. 7, a plan showing a few links of the chain.

The links of the chain are each composed of a plurality of plates, 8, adapted to arch over the teeth, 10, of the sprocket wheels, the plates of each link being preferably interspersed upon the pintles, 9, with the plates of the adjoining links. The plates of each link are formed with external engaging surfaces upon their outside ends, 11 and 12, for engagement with the inner surface, 14, of the sprockets, and are also provided with an internal engaging surface, 13, for bearing upon the outer surface, 15, of the teeth of the driven wheel.

The teeth of standard sprocket wheels are ordinarily cut of a certain shape and angle according to the size of wheel and number of teeth, and the external engaging surfaces, 11 and 12, are formed to correspond with the angle of the sprockets for all standard sizes of wheels. The inner faces, 14, of the teeth, are formed in this same way, as indicated in the diagram, Figs. 4, 5 and 6, but the outer surfaces, 15, are formed at a constant angle which is equal to the angle of the engaging surface, 13, on the link and is uniform for all sizes of wheels. Where the chain is designed to run mostly in one and the same forward direction, the projecting end, 12, of the links may be slightly smaller than the end, 11, so that normally the internal bearing surface, 13, engages the outer face, 15, of the driven sprocket slightly before the end, 12, touches the inner face, 14, and the chain may then be said to have one end engagement. When, however, the chain compensates for wear by riding out upon the driven sprocket, the outside end surface, 12, will come in contact with the inner face, 14, of the sprocket wheel and prevent the chain from slipping over the teeth.

With the so-called double angle tooth, there is considerable advantage, particularly in the smaller sizes of wheels, as the inclination of the surface, 15, may be made at a greater angle to the line of pull than would be possible with a standard faced sprocket, and thereby diminish the noise produced in the operation of the chain, and also increase its durability. As the angle of the outer face, 15, is constant and uniform in different sized wheels, while the angle of the face, 14, varies, it will be seen that for one particular size these surfaces may substantially coincide in a single plane, while for smaller wheels, the surfaces make an angle with each other of greater than 180 degrees, and for larger wheels, the surfaces make an angle with each other of less than 180 degrees, as indicated in Figs. 5 and 6.

Although the internal surfaces, 13, would engage the outer face, 15, on one side of the tooth only in a chain operating continually, in the same forward direction, it is preferred that the faces, 15, should be formed on both sides of the teeth for the sake of symmetry and uniformity in manufacture, so that the wheel may be placed upon the shaft either way, and the operation of the chain may then also be reversed, if desired.

Having now described my invention, what I claim as new and desire to secure by Letters Patent is:

1. The combination, with a sprocket wheel having teeth provided with outer bearing faces and inner bearing faces, of a drive chain formed of links composed of a plurality of plates having external surfaces engaging said inner bearing faces upon the driving wheel and internal surfaces engaging said outer bearing faces upon the driven wheel.

2. The combination, with a sprocket wheel having teeth provided with outer bearing faces and inner bearing faces, of a drive chain formed of links composed of a plurality of plates, the plates of each link having an external surface at one end for engaging said inner bearing faces upon the driving wheel, and an internal surface at the same end of the link for engaging said outer bearing faces upon the driven wheel.

3. The combination, with a sprocket wheel having teeth provided with outer bearing faces and inner bearing faces, of a drive chain formed of links composed of a plurality of plates, the plates of each link having external surfaces at both ends for engaging said inner bearing faces, and an internal surface at one end for engaging said outer bearing faces.

4. The combination, with a sprocket wheel having teeth, each provided on both sides with outer bearing faces and inner bearing faces, of a drive chain formed of links composed of a plurality of arched plates, the plates of each link having external surfaces at both ends for engaging said inner bearing faces, and internal surfaces at one end for engaging said outer bearing faces.

5. The combination with a sprocket wheel having symmetrical double faced teeth with outer and inner bearing faces, of a drive chain formed of links each composed of a plurality of arched plates, the plates of each link having an external surface at one end for engaging said inner bearing faces upon the driving wheel, and an internal surface for engaging the outer bearing faces upon the driven wheel.

In testimony whereof I have hereunto set my hand.

FRANK L. MORSE.